E. SOKAL.
PRIMARY BATTERY.
APPLICATION FILED OCT. 22, 1915.

1,258,266.

Patented Mar. 5, 1918.

Edward Sokal
INVENTOR.

BY Felix Stern

ATTORNEYS.

UNITED STATES PATENT OFFICE.

EDWARD SOKAL, OF CHICAGO, ILLINOIS.

PRIMARY BATTERY.

1,258,266.  Specification of Letters Patent.  Patented Mar. 5, 1918.

Application filed October 22, 1915. Serial No. 57,315.

*To all whom it may concern:*

Be it known that I, EDWARD SOKAL, a citizen of the United States of America, residing at Chicago, in the county of Cook and State of Illinois, have invented new and useful Improvements in Primary Batteries, of which the following is a specification.

This invention relates to improvements in primary batteries, and particularly in that class of batteries which can be used to deliver large power and which can readily be regenerated.

Batteries adapted to be used on a commercial scale must comply with certain requirements. They must be simple in their mechanical design; they must comprise electrodes and electrolytes which can be cheaply manufactured, and they must be readily subject to regeneration by methods which are simple or which can be employed on a large scale.

An object of the present invention, therefore, is to provide a battery of this character in which as an electrolyte a single fluid is used which is also preferably homogeneous; that is, has in all of its portions the same composition. The necessity of using porous diaphragms, cups, or the like is dispensed with.

Another object of the invention is to provide a battery in which the electromotive force is comparatively high, while the local action is comparatively low, whereby the efficiency of the entire battery is raised.

With these and many other objects in view, the novel battery and its mode of operation is described in the following specification, reference being had to the accompanying drawings, wherein—

Figure 1:
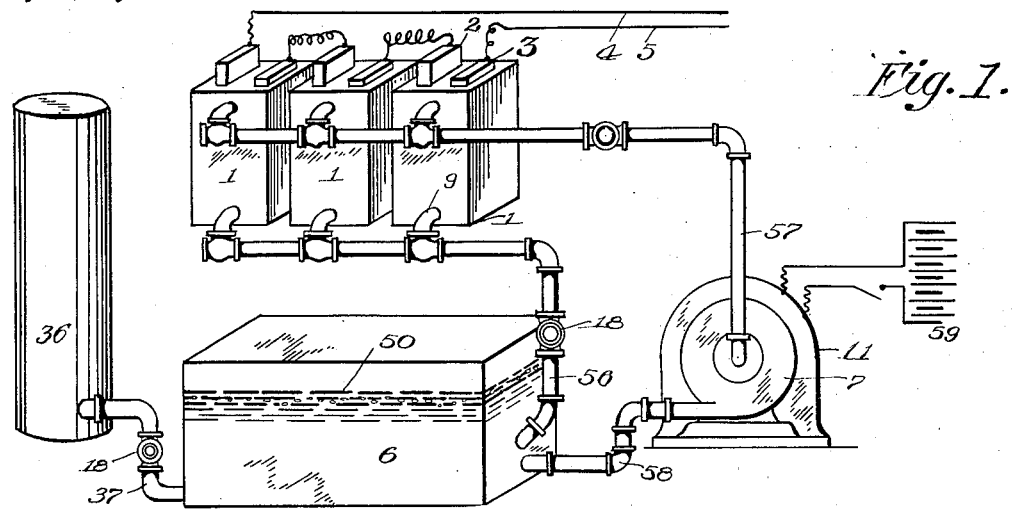
Figure 2:
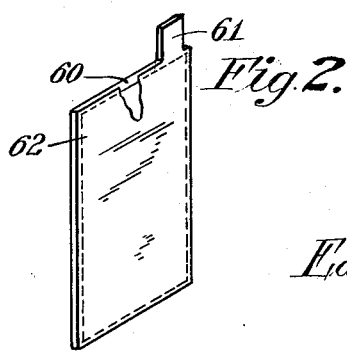

Figure 1 is a perspective view of a battery combined with a regenerating device, and Fig. 2 is a perspective view of a battery anode provided with a tight-fitting envelop.

In order to obtain a battery which can readily be regenerated, I use as electrolyte a fluid containing a solution of a metallic salt which is capable of combining at different valencies, wherein this combination of higher valence, owing to the chemical action of the battery, is reduced to the combination of a lower valence, so that the regeneration then again comprises the step of reconverting the fluid containing the combination of lower valence into that of higher valence. A solution of ferric chlorid, to which substances as sodium chlorid and so forth may be added for the purpose of improving the conductivity, is used as the electrolyte, and the electrodes are composed of carbon and zinc respectively. This solution is adapted to act not only as a solvent on the zinc, but also as a depolarizer.

The battery has the advantage that the zinc may be directly immersed into the ferric chlorid solution without the use of any porous diaphragm or porous cup, so that the electrolyte is in contact with the zinc. During the discharge of this battery the zinc goes into solution as zinc chlorid and the ferric chlorid is converted into ferrous chlorid, while ferric chlorid may still be present together with ferrous chlorid in the solution.

Contrary to expectations and contrary to accepted theories, the local action in a battery of this character is lower than the local action in a battery in which the same electrolyte is used in combination with carbon and iron as electrodes, and the electromotive force, in spite of this decreased local action, is higher than that of a battery in which the same electrolyte is used with iron.

While it has also been proposed to use an anode of tin with a battery of this character, it is to be noted that tin is not only much more expensive, but the immersion of tin in ferric chlorid produces stannous chlorid, which reacts with the ferric chlorid. In the present case, however, soluble zinc chlorid, which remains in solution together with the ferrous chlorid, is formed, and at the same time the electrolyte may be used as a depolarizer.

It is furthermore to be noted that the regeneration of the original ingredients in a battery of this kind is very simple, and is based on well-known chemical processes. The discharge reaction of the battery may find expression in the following equation:

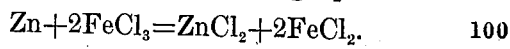
$$Zn + 2FeCl_3 = ZnCl_2 + 2FeCl_2.$$

By introducing into this solution (which at the end of the discharge contains zinc chlorid, ferrous chlorid, and very little ferric chlorid) chlorin in liquid or gaseous form, the ferrous chlorid will be regenerated to ferric chlorid, in accordance with the following equation:

$$Cl_2 + 2FeCl_2 = 2FeCl_3.$$

If, after repeated introductions of chlorin into the ferrous chlorid and zinc chlorid solution, a further restoration of the ferrous chlorid to ferric chlorid is not desirable on account of the fact that the electrolyte contains too much zinc chlorid, this mixture of ferrous chlorid and zinc chlorid can be regenerated electrolytically. This can be done in many various ways, of which in the following one example is given.

This regeneration of zinc chlorid and ferrous chlorid into zinc and ferric chlorid by an electrolytic bath is based on well-known chemical reactions. The ferrous chlorid solution can be kept in the anode compartment and the zinc chlorid solution in the cathode compartment; the two compartments are separated by a porous diaphragm. It is also possible to obtain this regeneration by electrolyzing the zinc chlorid only. The first step consists in both cases preferably of reducing the remaining ferric chlorid into ferrous chlorid and of separating the zinc chlorid from ferrous chlorid, which is much less soluble than zinc chlorid, by fractional precipitation effected by evaporation of part of the water; and the second step consists of freeing the zinc chlorid solution of the last traces of iron with zinc dust or zinc powder by blowing air into the solution or by roasting the mixture of solid zinc and ferrous chlorid at low temperature. This roasting at low temperature converts the iron chlorids into iron oxids, and by the introduction of the chlorin evolved from the zinc chlorid electrolysis into the iron, the iron oxids and into the ferrous chlorid solution, ferric chlorid is produced. The separation of zinc from zinc chlorid and the evolution of chlorin are effected electrolytically in a well-known way. In this manner by the use of heat and power all the ingredients of the battery are regained.

While the precipitation of iron by zinc from a mixture of zinc chlorid and ferrous chlorid is a reaction which can readily be carried through, it is remarkable that in the discharge of the battery, with zinc as anode metal, no precipitation of iron will take place if, in addition to ferrous chlorid and zinc chlorid, this solution also contains ferric chlorid. This precipitation of the metal from the electrolytic fluid also will occur if, instead of ferric chlorid, a solution of a salt of a different metal capable of combining at different valencies, for instance cupric chlorid, is used. In the combined presence of ferric chlorid and ferrous chlorid, however, no precipitation of iron by zinc takes place, and this novel feature, together with the remarkably low local action and the remarkably high electromotive force (approximately 1.5 volts at open circuit) are of great value for the practical use of this primary battery.

In order to furthermore decrease the local action by mechanical means, provision is made to decrease the convection toward the soluble electrode and to increase the convection toward the insoluble electrode. These mechanical means for decreasing the convection toward the soluble electrode consist of an envelop which tightly surrounds the zinc anode and which will prevent convection without preventing electrolytic action of the electrolyte on the metal. A tightly fitting envelop of parchment paper has been found valuable for this decrease of the convection, while circulation of the electrolyte through the battery has been found valuable as a means for increasing the convection toward the other electrode.

As may be seen from Fig. 1, the battery illustrated in perspective view diagrammatically comprises a plurality of jars or receptacles 1, in which the two carbon electrodes 2 and zinc electrodes 3 are immersed. Service wires 4 and 5 extend from the terminals of the battery to the various devices in which the current is to be consumed.

For the purpose of decreasing the convection with respect to the zinc anode, this anode (shown at 60 in Fig. 2), which is provided with a lug 61 for the attachment of conductors (not shown), is covered on all sides, as far as it is immersed into the electrolyte, by a tight fitting envelop 62, which may consist of a layer of parchment paper or the like. The coating may be applied by dipping the electrode into the liquefied mass which, when hardened, constitutes the parchment paper.

For the purpose of increasing the convection with respect to the carbon cathode, circulation means may be used, which are illustrated diagrammatically in Fig. 1 as comprising a pump 7 driven by an electromotor 11, which has its source of energy, indicated in the form of a battery, at 59. A pipe 57 leads from this pump to the various jars 1 of the battery, and the circulation is completed by means of connections 9 leading from the same jars to a pipe 56, in which a valve 18 is inserted. This pipe 56 terminates in another reservoir or container 6 holding a liquid which may consist of a mixture of ferrous chlorid, ferric chlorid, and zinc chlorid. This mixture again may be sent into the jars 1 of the battery by passing from the container 6 through the pipe 58 to the pump 7. In order, however, to convert the ferrous chlorid held in this container 6 into ferric chlorid, this container is also connected by the pipe 37 with the tank of chlorin, indicated at 36. During the rest periods of the battery the electrolyte is kept in the container 6 and is not in contact with the zinc electrodes.

It is therefore possible by means of this arrangement to re-convert the ferrous chlorid forming part of the mixture in the tank 6 into ferric chlorid through introduction of chlorin, and to return this mixture into the jars of the battery and to repeat this intermittent restoration until the contents of zinc chlorid in the electrolytic fluid are so large that the use of an entirely new electrolyte, consisting of ferric chlorid exclusively and free of an admixture of zinc chlorid, becomes desirable.

The conditions and requirements of the actual service and of the particular application would determine in each case whether such reconversion of ferrous into ferric chlorid by means of chlorin is advisable and how many times it should be repeated, before an entirely new electrolyte is used, and the old electrolyte subjected to the electrochemical regeneration.

I claim:

1. A primary battery, comprising two electrodes, one of which is zinc, and a single fluid electrolyte containing a solution of the salt of a metal capable of combining at different valencies and in this case combined at its higher valence, the aqueous solution of said salt without any other addition being adapted to act as solvent on the zinc and as a depolarizer.

2. A battery, comprising in combination a liquid containing the aqueous solution of the chlorid of a metal capable of combining at different valencies and in this case combined at its higher valence, as an electrolyte, and two electrodes, of which one is zinc, the said electrolyte being in contact with the zinc and being adapted to act as a depolarizer.

3. A primary battery, comprising in combination a liquid containing an aqueous solution of a ferric chlorid as an electrolyte, and two electrodes, of which one is zinc, the said electrolyte being in contact with the zinc.

4. A primary battery, comprising two electrodes, one of which is zinc, and an electrolyte containing an aqueous solution of the salt of a metal capable of combining at different valencies and in this case combined at its higher valence, said electrolyte being capable of acting as a solvent on the zinc and at the same time as a depolarizer.

5. A primary battery, comprising two electrodes, one of which is zinc, and an electrolyte containing an aqueous homogeneous solution of a ferric salt capable of acting as a solvent on the zinc and at the same time as a depolarizer.

6. A primary battery, comprising in combination a homogeneous liquid consisting of an aqueous solution of a ferric salt as an electrolyte, and two electrodes, of which one is zinc, said solution being in direct contact with said zinc.

7. A primary battery, comprising two electrodes, one of which is non-amalgamated zinc, and a single fluid electrolyte consisting exclusively of a solution of the salt of a metal capable of combining at different valencies, and in this case combined at its higher valence, the aqueous solution of said salt without any other addition being adapted to act as a solvent on the non-amalgamated zinc, and as a depolarizer.

8. A primary battery, comprising two electrodes, one of which is zinc, an electrolyte containing a homogeneous solution of a ferric salt, and means for decreasing convection of the zinc electrode and means for increasing the convection with respect to the other electrode.

EDWARD SOKAL.